April 13, 1926.

R. GNEHM

WATER HEATING POT

Filed March 12, 1925

1,581,055

INVENTOR
Rudolph Gnehm
BY
ATTORNEY

Patented Apr. 13, 1926.

1,581,055

UNITED STATES PATENT OFFICE.

RUDOLPH GNEHM, OF JERSEY CITY, NEW JERSEY.

WATER-HEATING POT.

Application filed March 12, 1925. Serial No. 14,870.

*To all whom it may concern:*

Be it known that I, RUDOLPH GNEHM, a citizen of Switzerland, residing at Jersey City, in the county of Hudson and State of New Jersey, have invented certain new and useful Improvements in Water-Heating Pots, of which the following is a specification.

This invention relates to a pot or kettle for use in heating water, the invention having for an object to provide a novel and improved type of water heating pot capable of more general adaptation, and which will facilitate the saving or economy of gas when water is being heated.

For further comprehension of the invention, and of the objects and advantages thereof, reference will be had to the following description and accompanying drawing, and to the appended claims in which the various novel features of the invention are more particularly set forth.

Fig. 1 of the drawing is a central vertical sectional view of my improved pot.

As here shown my improved pot comprises a suitably shaped body 10 of the usual circular form as seen in plan view, For convenience in use on gas stoves or ranges, and to adapt the pot to various apertures in the top of the stove, the bottom of the pot is in the form of a number of stepped depressions, 11, 12 and 13 sinking one below the other, the lower ones being of smaller diameter, as will be understood. The pot can thus be made to fit snugly into different size openings in the top of the stove with a resulting economy of gas.

Figure 1:
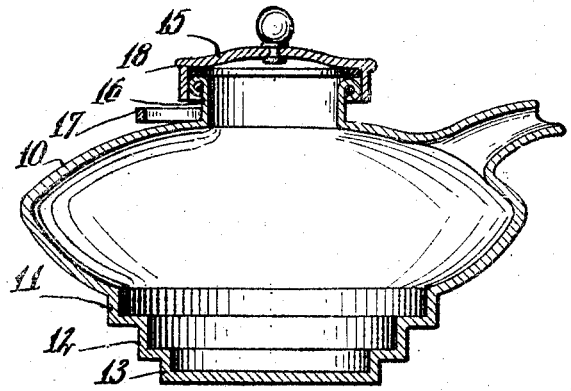
Figure 2:
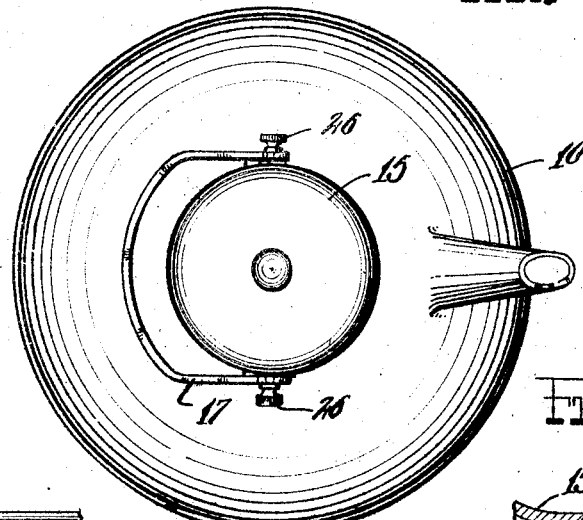
Fig. 2 is a plan view thereof.
Figure 3:
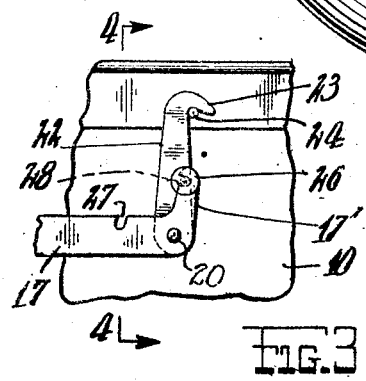
Fig. 3 is an enlarged fragmentary side view.
Figure 4:
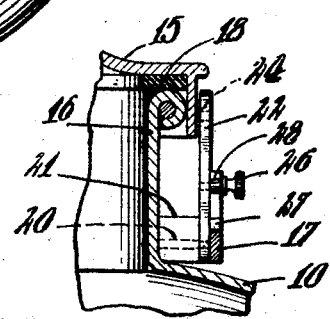
Fig. 4 is a detail vertical sectional view taken on the line 4—4 of Fig. 3.

The pot is provided with a cover 15 which fits on a neck 16 projected upward from the body of the pot, and has attached thereto a handle 17. To adapt the pot for a general use I have provided means operated by the handle, when the latter lies in different positions for clamping the cover tightly on the top of the neck, a rubber gasket 18 being preferably inserted in the cover to bear on the said neck. The handle comprises a bail that is hinged to studs such as 20 fixed to projections such as 21 on the sides of the neck. On each stud is also hinged a short link or arm 22 having a hook 23 on its free end. This link may assume a position vertical with respect to the handle as shown in Fig. 3, in which position the hook thereon engages over a pin or stud 24 on the cover 15 and retains the latter in closed position. The links may also be swung to position lying along the handle 17 being each retained in either position by means of a screw 26 threaded into the link and adapted to be engaged in either of a pair of notches 27, 28 one of which is formed in the side of the handle, and the other in a short offset 17' from the handle. With this arrangement, as will be apparent, the pot may be transported, with the cover locked thereon, and with the handle projected laterally over the body of the cover to economize space or the cover may be locked in position with the handle arranged for free swinging movement, and extending in a generally vertical direction with respect to the pot. When the hooks are not to be used the arms 22 are swung along the handle and locked to the latter by the screws 26 which are then engaged in the notches in the handle. The handle also, it will be noted, operates as a handle or lever to move the hooks to and from operative position permitting the hooks to be constructed to tightly clamp the cover upon the pot, as may be desirable when liquid is being transported.

Having thus described my invention, what I claim as new and desire to protect by Letters Patent of the United States is as follows:

1. A water heating pot comprising a body, a handle hinged thereto, a cover on said body, and means on said handle adapted to engage said cover to clamp the same to the pot when the said handle is in position extending horizontally over the pot, said means comprising a pair of hooked members detachably fixed to said handle.

2. A water heating pot comprising a body, a handle hinged thereto, a cover on said body, and means on said handle adapted to engage said cover to clamp the same to the pot when the said handle is in position extending horizontally over the pot, said means comprising a pair of hooked arms hinged to said body coaxially with the handle to engage the cover, and screws carried by the said arms for clamping the latter to the said handle.

3. A water heating pot comprising a body, a handle hinged thereto, a cover on said body, and means on said handle adapted to engage said cover to clamp the same to the pot when the said handle is in position extending horizontally over the pot, said means comprising a pair of hooked arms hinged to said body coaxially with the handle to engage the cover, and screws carried by the said arms for clamping the latter to the said handle, said handle being formed with notches to receive the said screws.

In testimony whereof I have affixed my signature.

RUDOLPH GNEHM.